US007349297B2

(12) United States Patent
Hanks

(10) Patent No.: US 7,349,297 B2
(45) Date of Patent: Mar. 25, 2008

(54) METHOD AND APPARATUS FOR ACQUIRING AN INDEX MARK

(76) Inventor: Darwin M. Hanks, 3404 E. Harmony Rd., Bldg. 6A MS 70, Ft. Collins, CO (US) 80528

( * ) Notice: Subject to any disclaimer, the term of this patent is extended or adjusted under 35 U.S.C. 154(b) by 695 days.

(21) Appl. No.: 11/012,691

(22) Filed: Dec. 14, 2004

(65) Prior Publication Data

US 2006/0126474 A1 Jun. 15, 2006

Related U.S. Application Data

(60) Provisional application No. 60/635,092, filed on Dec. 11, 2004.

(51) Int. Cl.
*G11B 5/09* (2006.01)
*G11B 7/24* (2006.01)
(52) U.S. Cl. .................. 369/44.27; 369/47.31; 369/59.17; 369/59.25; 369/30.01
(58) Field of Classification Search .................. None
See application file for complete search history.

(56) References Cited

U.S. PATENT DOCUMENTS

| | | |
|---|---|---|
| 4,556,966 A | 12/1985 | Bricot |
| 4,933,786 A | 6/1990 | Wilson |
| 5,646,920 A | 7/1997 | Raczynski |
| 6,034,934 A | 3/2000 | Miyake |
| 6,744,712 B2 | 6/2004 | Hanks et al. |
| 6,813,231 B1 | 11/2004 | Hanks |
| 2003/0007432 A1* | 1/2003 | Minamino et al. ........ 369/47.21 |
| 2003/0026187 A1* | 2/2003 | Tanoue et al. ........... 369/59.24 |
| 2004/0136279 A1 | 7/2004 | Koll |
| 2004/0141045 A1 | 7/2004 | Hanks |
| 2004/0141046 A1 | 7/2004 | Hanks |
| 2004/0141385 A1 | 7/2004 | Pettigrew |
| 2004/0141445 A1 | 7/2004 | Hanks |
| 2005/0005104 A1 | 1/2005 | Hanks |
| 2005/0047286 A1 | 3/2005 | Hanks |
| 2005/0047287 A1 | 3/2005 | Hanks |
| 2006/0203679 A1* | 9/2006 | Kashihara et al. ....... 369/59.22 |

FOREIGN PATENT DOCUMENTS

| | | |
|---|---|---|
| EP | 0532997 | 3/1993 |
| EP | 0833335 | 4/1998 |
| JP | 2004063030 | 2/2004 |
| WO | WO 03/081593 | 10/2003 |

OTHER PUBLICATIONS

International Search Report (PCT/US2005/038567), dated Jun. 29, 2006.
DVD Technical Guide—Chapter 2 Physical Format of Read-Only Discs, pp. 1-7, http://www.pioneer.co.jp/crdl/tech/dvd/2-e.htm, no date.
DVD Technical Guide—Chapter 1 DVD Overview, pp. 1-2, http://www.pioneer.co.jp/crdl/tech/dvd/1-e.html, no date.
PIONEER R&D, Technical Report, DVD special number issue, (1996 vol. 6 No. 2); http:/www.pioneer.co.jp/crdl/rd/6-2e.html.

* cited by examiner

*Primary Examiner*—Muhammad Edun

(57) ABSTRACT

A method and apparatus for reading an index mark pattern. The pattern may be formed on an optical disc medium. The optical disc medium may include a set of data arranged in a data field, and an index mark pattern for identifying a relative location of the data field.

42 Claims, 10 Drawing Sheets

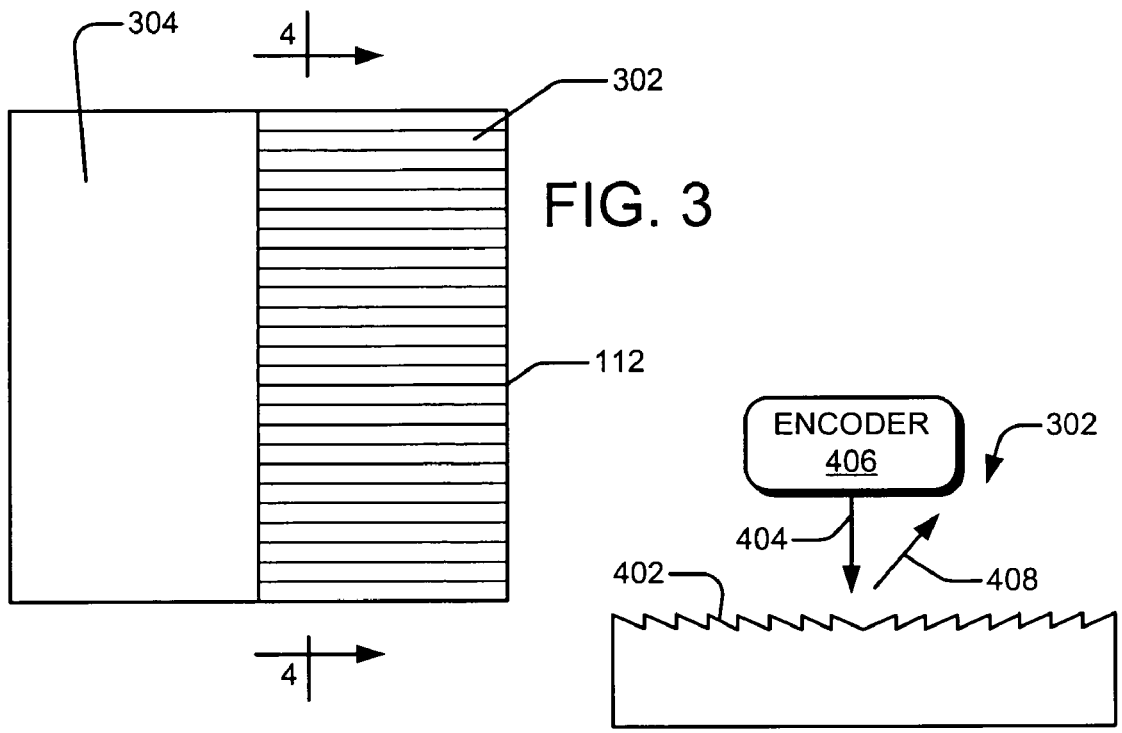
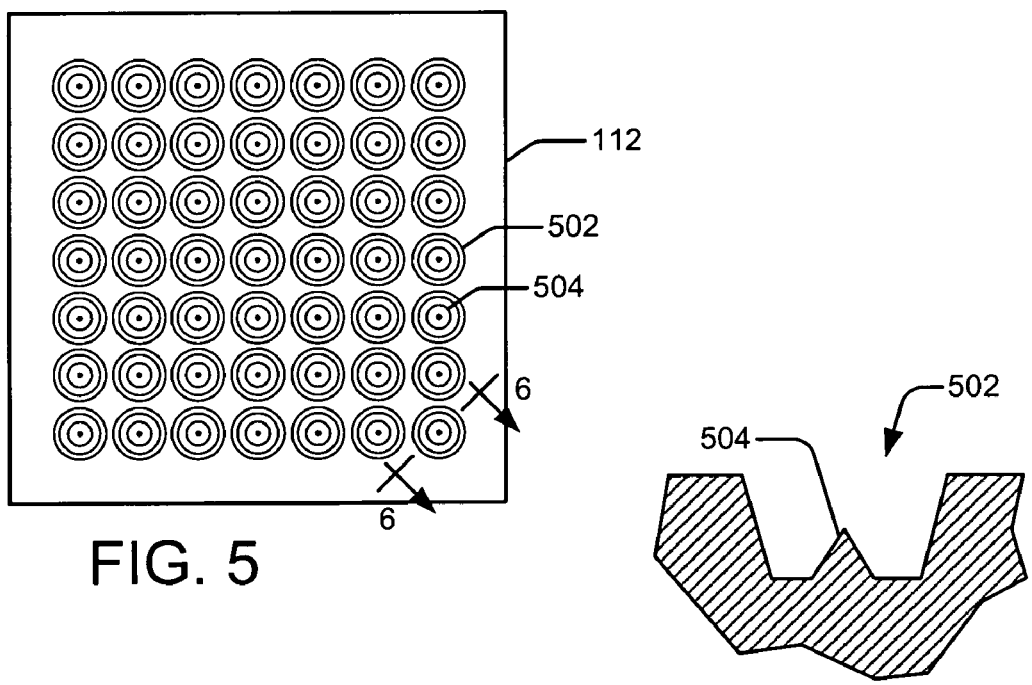

METHOD AND APPARATUS FOR ACQUIRING AN INDEX MARK

CROSS-REFERENCE TO RELATED APPLICATION

This application claims priority from provisional application number 60/635,092, filed Dec. 11, 2004.

BACKGROUND

Digital data streams or patterns may be marked with an index pattern or mark to facilitate reading the data. Identifying the index pattern may be problematic, thus leading to problems in reliably reading the data patterns.

An optical disc, such as a compact disc (CD), is an electronic data storage medium that can be written to and read using a low-powered laser beam. A CD is typically used for electronically recording, storing, and playing back audio, video, text, and other information in digital form. A digital versatile disc (DVD) is another more recent type of optical disc that is generally used for storing and playing back movies because of its ability to store much more data in the same space as a CD.

CDs were initially a read-only storage medium that stored digital data as a pattern of bumps and flat areas impressed into a piece of clear polycarbonate plastic through a complex manufacturing process. Thus, the average consumer often owned a number of CD's that had both desired data (e.g., a few songs they enjoyed on a CD) and undesired data (e.g., the remaining songs on the CD that they disliked). However, average consumers can now put their own data on their own CDs with CD players capable of burning digital data into CD-Rs (CD-recordable discs) and CD-RWs (CD-rewritable discs).

As more and more consumers burn their own CDs, the need for convenient ways to identify the data on such CDs has increased. Methods for labeling the non-data side of optical discs (e.g., CDs, DVDs) with text and images, for example, have continued to develop. Basic methods for labeling a disc include physically writing on the non-data side with a permanent marker (e.g., a Sharpie marker) or printing out a paper sticker label and sticking it onto the non-data side of the disc. Other physical marking methods developed for implementation in conventional CD players include ink jet, thermal wax transfer, and thermal dye transfer methods. Still other methods use the laser in a conventional CD player to mark a specially prepared CD surface. Such methods apply equally to labeling CDs and DVDs.

A label image can be rendered on the label surface (i.e., the non data side, or top side) of an optical disc by marking the label surface with a laser beam along concentric circles around the disc. For each circle, spots of constant size and optical density are marked by the laser according to the marking data for that circle.

For rendering the label image, it may be useful to place data identifying characteristics of the optical disc and the labeling process parameters which may be specific to the disc. Reading the data can be problematic.

BRIEF DESCRIPTION OF THE DRAWINGS

Features and advantages of the disclosure will readily be appreciated by persons skilled in the art from the following detailed description when read in conjunction with the drawing wherein:

FIG. 3 is schematic view of an exemplary disc feature.

FIG. 4 is a cross-section of the exemplary detail of FIG. 3, taken along the 4-4 lines of FIG. 3.

FIG. 5 is an enlarged view of a second exemplary disc feature.

FIG. 6 is a cross-sectional view of the exemplary detail of FIG. 5, taken along the 6-6 lines of FIG. 5.

DETAILED DESCRIPTION

Figure 1:
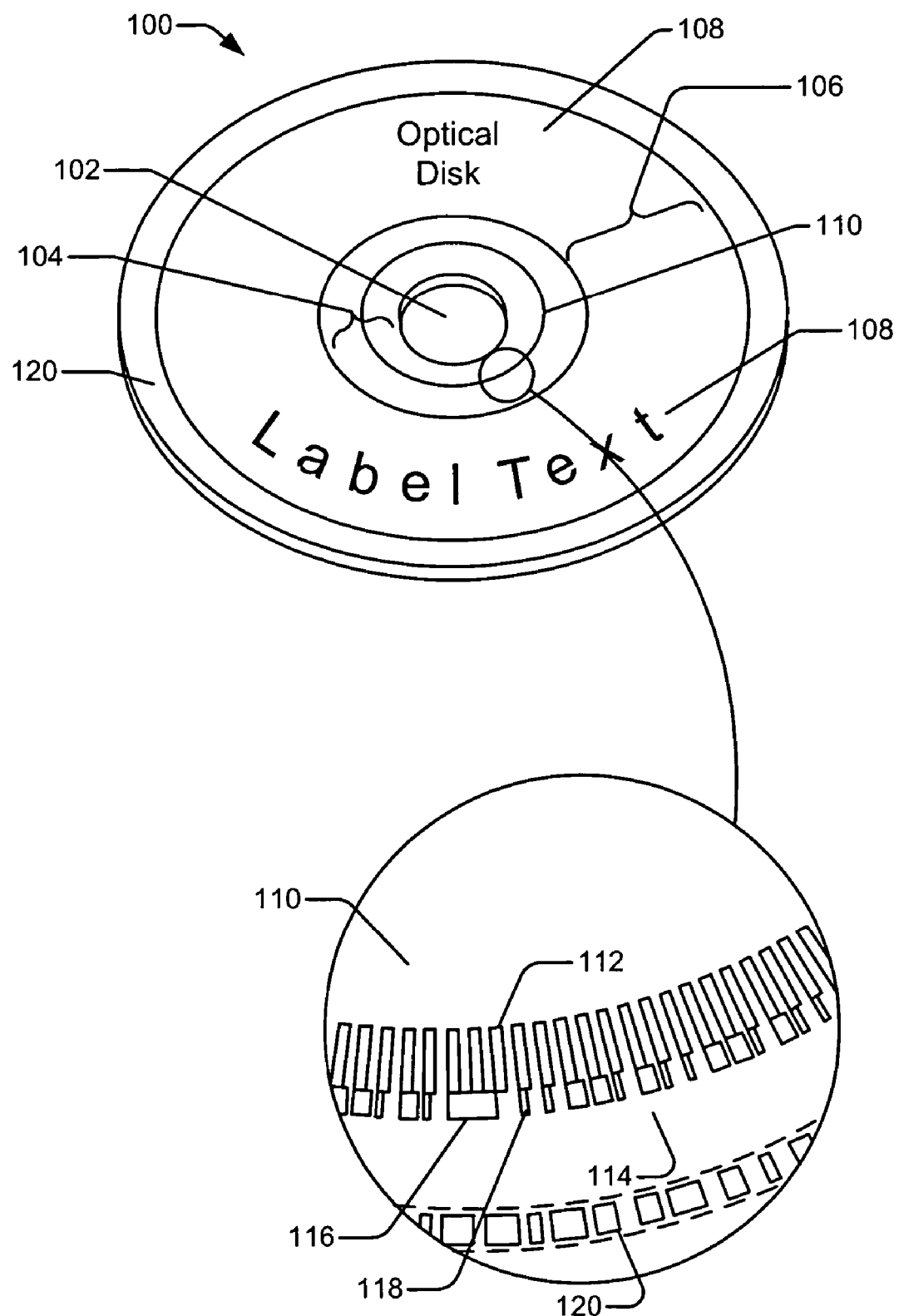
FIG. 1 is an isometric view of an optical disc, showing exemplary disc speed features and disc angular orientation features.

In the following detailed description and in the several figures of the drawing, like elements are identified with like reference numerals.

In an exemplary embodiment, an optical disc may be configured to allow application of an image to a label side of the disc. The disc includes features, which may be molded, silk screened or otherwise formed or applied, which provide disc orientation (i.e. the way the label side of the disc is oriented within an optical drive), rotational speed and angular orientation information (i.e. the direction a ray originating from the center of the disc and passing through a given point on the perimeter of the disc is pointed within the disc drive) during the image application process. The optical disc drive contains an encoder which monitors the features, thereby initially detecting disc orientation, and subsequently monitoring disc speed and angular orientation, thereby assisting in the application of the image to the label surface of the optical disc. In one exemplary implementation, disc speed relative to the OPU (i.e. the speed at which the media passes the OPU (optical pickup unit), resulting in a constantly varying RPM as the OPU moves radially outward) is held at 0.25 meters/second, to within +/−0.02%, by a spindle motor.

FIG. 1 is an isometric view of a first exemplary optical disc 100 configured for application of an image to an image or label side (generally, the side opposite a data side) of the disc. The disc 100 may be a CD, DVD or similar optical disc. A central hole 102 is surrounded by a region 104, which may or may not have mirrored appearance, depending on the manufacturing process. A label region 106 is coated with a material that is OPU-writable (i.e. writeable by an optical pick-up unit. An image 108, such as text or graphics, may be applied to the label region 106 during the labeling process.

The labeling process can include reading features 110, which first provide information on disc orientation (i.e. which way is a given planar surface of the disc oriented within the disc drive), and then provide information on disc speed (angular or rotational speed, i.e. RPM) and disc angular orientation. In the exemplary optical disc 100, the features 110 are defined to allow observation while applying an image to the label side of the disc. Typically, the features are on the label side of the disc; however in alternate configurations, the features 110 could be defined on the data side of the disc, or on layers within the interior of the disc.

The features 110 of the exemplary optical disc 100 include an inner ring of disc speed features or spokes 112. When detected by an encoder, the disc speed features 112 in the inner ring may provide information on the speed of rotation of the optical disc 100. In the exemplary optical disc 100, the disc speed features 112 include molded areas spaced at intervals to provide a regular pattern of higher and lower light reflectivity. In one implementation, the disc speed features 112 are molded; in other implementations, the features could be printed, silk-screened onto the disc, or otherwise manufactured.

In an exemplary embodiment, the features 110 of the exemplary optical disc 100 also may include disc angular orientation features 114. When detected by an encoder, the disc angular orientation features 114 provide information on the angular orientation (i.e. which direction a ray originating in the center of the disc and passing through a given point on the perimeter of the disc is pointed) of the optical disc 100 during rotation. Information about the angular orientation of the disc implies information about the angular orientation of the label region 106 during the image application process. In the exemplary disc 100, the disc angular orientation features 114 include molded areas spaced at intervals to provide an irregular pattern of higher and lower light reflectivity. Alternatively, the features 114 could be silk-screened or printed onto the disc, or otherwise manufactured.

The exemplary disc angular orientation features 114 of optical disc 100 include a larger feature 116 and smaller features 118 separated by flat, light-reflective areas of varying size. Because the pattern is irregular, and/or not symmetric about a number of radial axes, it is possible to determine the angular orientation of the disc 100 as it turns within an optical disc drive by observing the features 114. For example, where a single larger feature 116 and a plurality of smaller features 118 are present, the angular orientation of the disc may be readily determined.

Figure 1A:
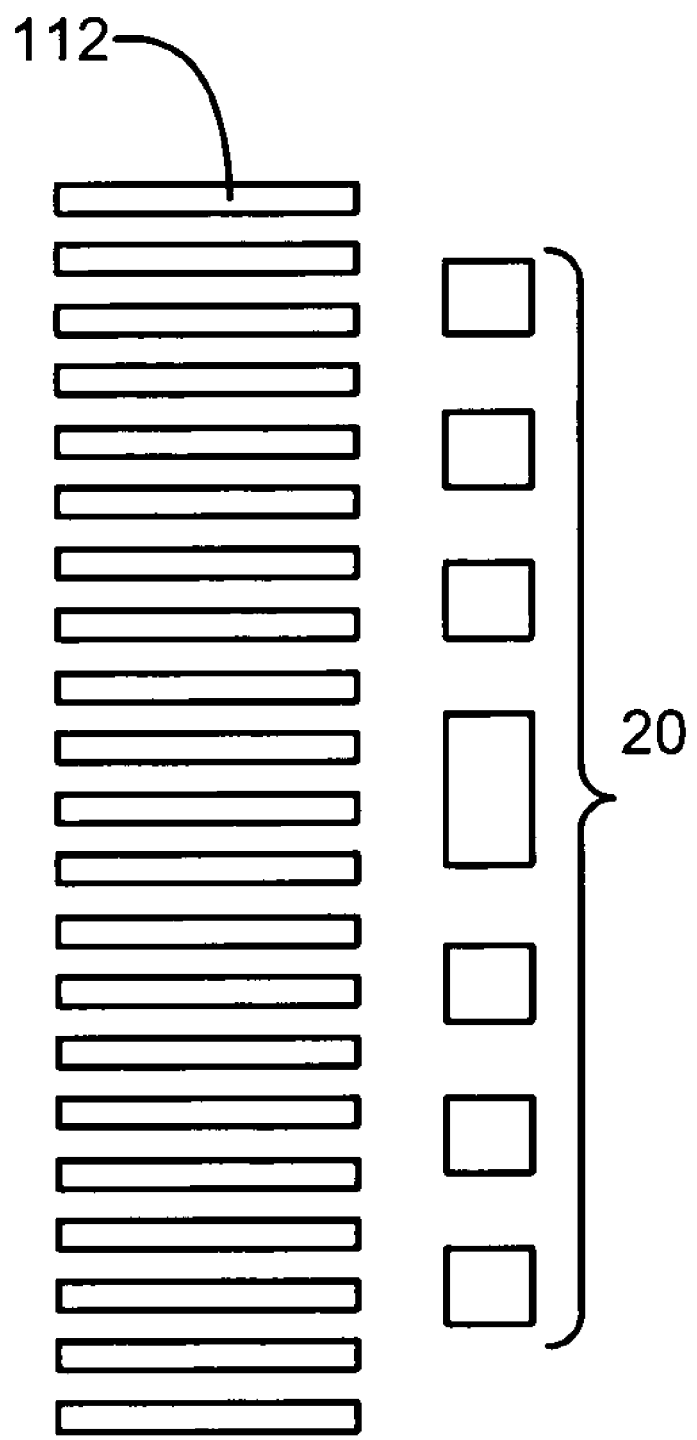
FIG. 1A diagrammatically depicts linearized portions of an inner ring of radial encoder spoke features and outer ring features.
Figure 8:
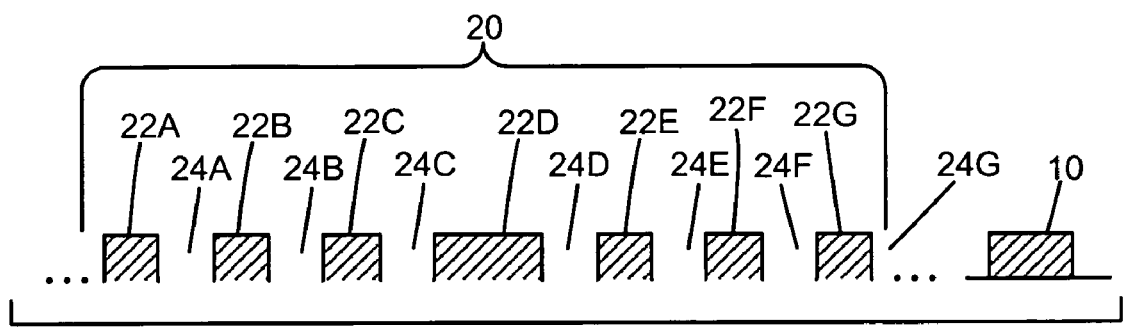
FIG. 8 depicts an exemplary index mark pattern including reflective regions and non-reflective regions.

The optical disc media 100 further includes an outer ring 120 of features which can define data 10 and index pattern data 20 for referencing the outer ring data features (FIG. 8). The outer ring may be located outwardly of the inner ring 114, but inside of the disc label area 106, or adjacent the outer rim of the disc outside the disc label area; both exemplary locations are illustrated in FIG. 1. Alternatively, the outer ring features can take the place of or be included in the features 114, as illustrated in FIG. 1A, which diagrammatically depicts linearized portions of an inner ring of radial encoder spoke features 112 and outer features 20. These features in ring 120 may include molded or embossed areas spaced at intervals to provide an irregular pattern of higher and lower light reflectivity. Alternatively, the features in ring 120 could be silk-screened or printed onto the disc, or otherwise manufactured.

Figure 2:
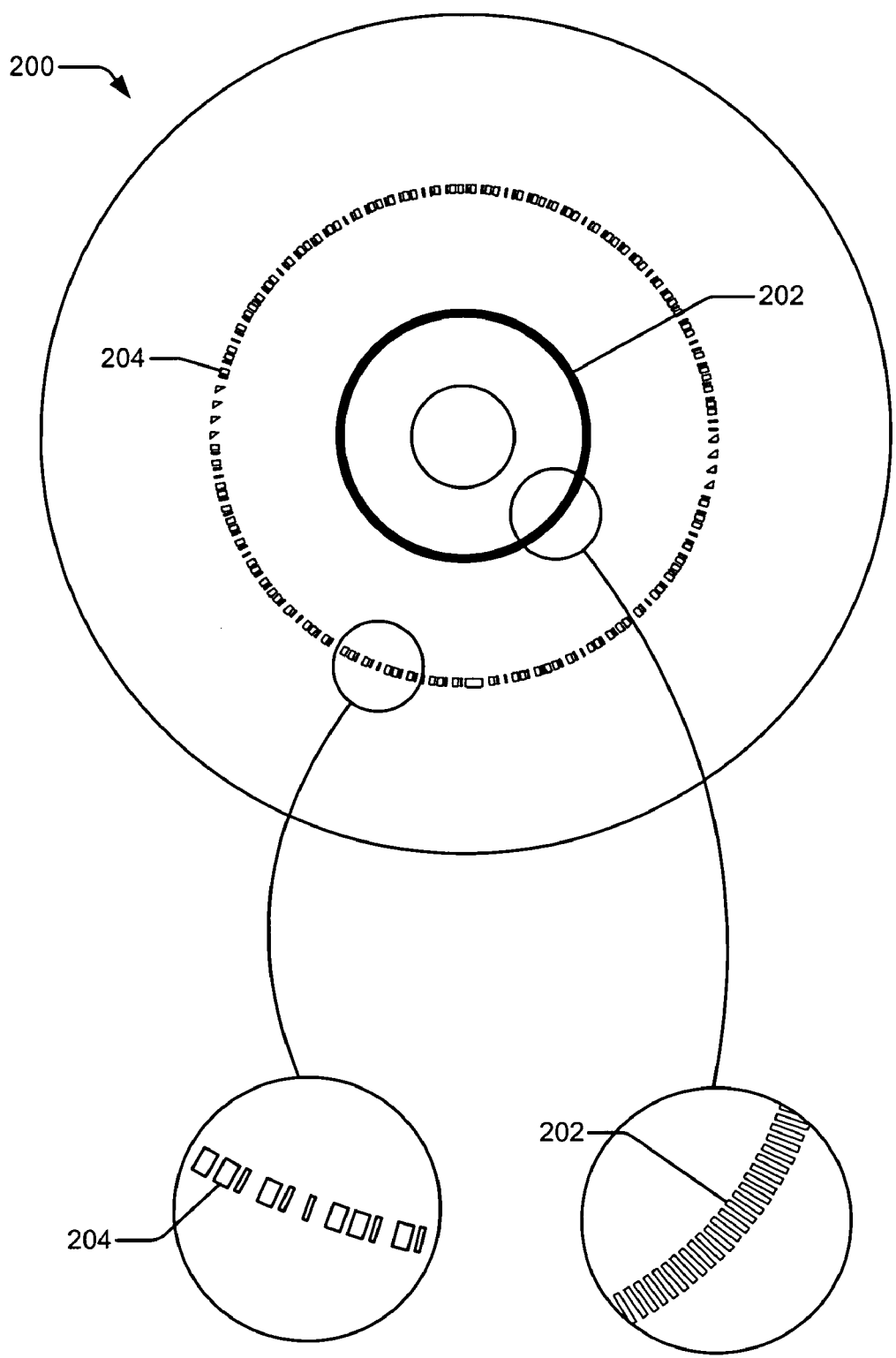
FIG. 2 is an orthogonal view of a second optical disc, showing further exemplary views of disc speed features and disc angular orientation features.
Figure 7:
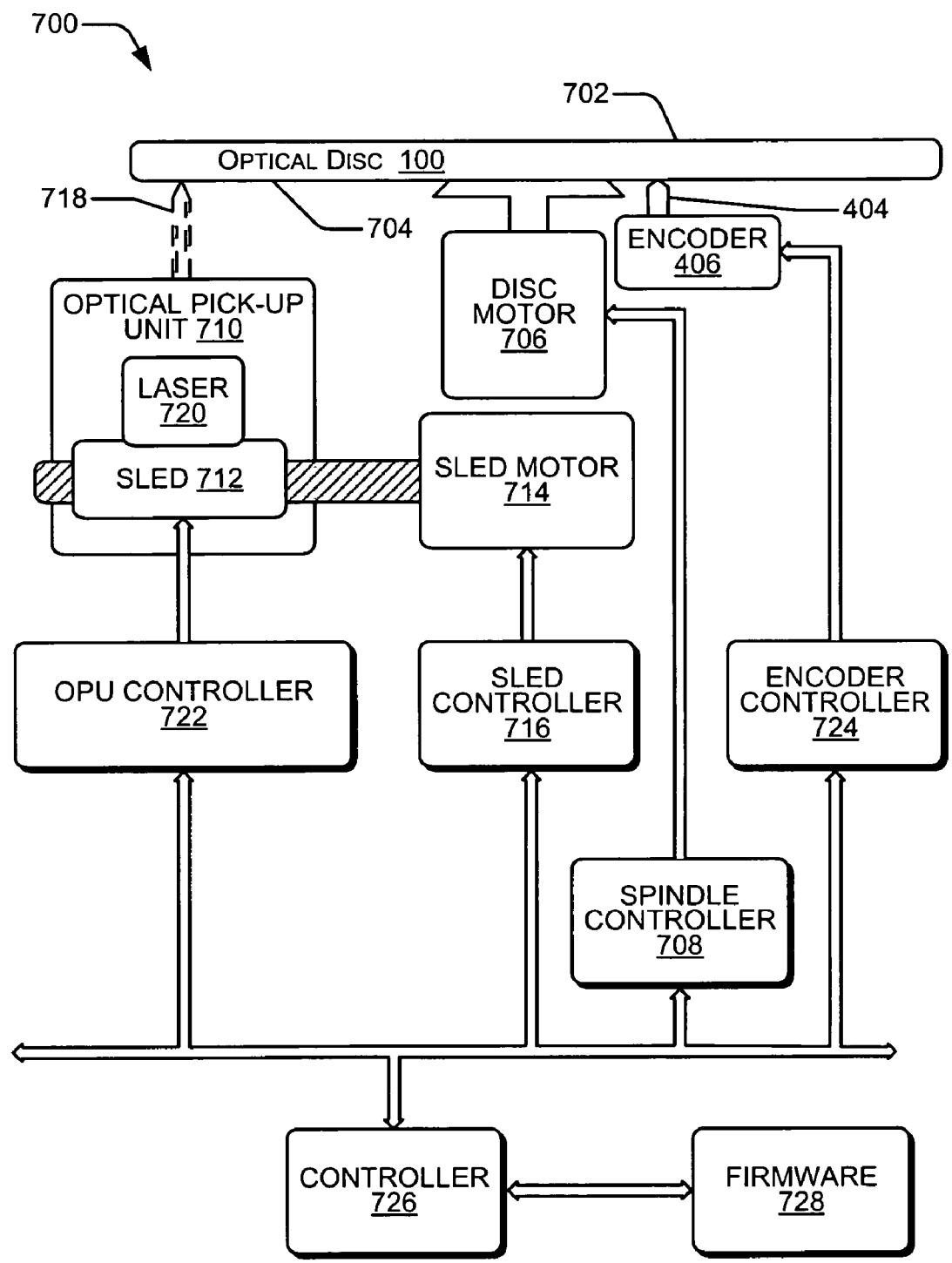
FIG. 7 is schematic view of an exemplary optical disc drive.

FIG. 2 is an orthogonal view of a second optical disc 200, showing further exemplary views of disc speed features 202 and disc angular orientation features 204. The disc angular orientation features 204 of the second disc 200 are typically suited for application to a DVD. In this case, the disc speed features 202 could be read by the encoder 406 and the disc angular orientation features 204 are readable by an OPU 710 (optical pick-up unit) of the optical disc drive 700 (FIG. 7).

The disc speed features 202 are similar to the disc speed features 112 (FIG. 1), but may be molded on an inner layer of a multilayered DVD disc. The disc angular orientation features 204 may be similarly molded or made by a silk-screening or similar manufacturing process. The disc angular orientation features 204 may be annularly distributed at a location any desired radial distance from the center of the optical disc 200, radially inside or outside the disc speed features. This disc may also include outer ring features in an outer ring 220 for providing data, e.g. media identification data and data index features, readable by an OPU 710 of the optical disc drive 700. While FIGS. 1 and 2 provide exemplary disc speed and disc angular orientation features, other implementations are possible. For example, the disc speed features and disc angular orientation features may be combined into an annular ring of features having information present in both 202, 204.

FIG. 3 is an enlarged view showing detail of a first exemplary molded feature (e.g. 112 from FIG. 1) or a molded disc angular orientation feature (e.g. 116 or 118 from FIG. 1). For example, the exemplary molded features can resemble a saw tooth region 302, as shown. The saw tooth region 302 tends to disperse light, thereby greatly lessening the amount of reflected light. In contrast, a reflective region 304, having a planar surface, reflects light. The contrast between the amount of light reflected allows a sensor to distinguish between the saw tooth region 302 and the reflective region 304.

FIG. 4 shows a cross-sectional view of the saw tooth region 302 originally seen in FIG. 3. Such a saw tooth region may be used to form exemplary the molded disc features, such as the molded features 112, 116 or 118 of FIG. 1. Surfaces 402 of the saw tooth are not perpendicular to incoming light 404 sent by a sensor or encoder 406, and therefore tend to send reflected light 408 away from the encoder.

The sensor or encoder 406 of FIG. 4 may be based on optical, magnetic or other technology. In one implementation, the encoder 406 is configured to direct light at the optical disc 100, and to distinguish between less reflective regions, such as the saw tooth surface 302 of a feature 112 and such as the molded disc features 116, 118, and more reflective regions 304 adjacent or between these features. In one implementation, the encoder 406 may be located a fixed radial distance from the center of the disc 100, separate from a region which is readable and/or writeable by an OPU 710 (FIG. 7). The encoder 406 may send conventional (i.e. incoherent, non-collimated, non-laser) light 404 or a laser (i.e. coherent, collimated light) at the surface of the disc 100, which is returned to the encoder upon reflection by the reflective surface 304, but wherein the reflection 408 is not substantially returned to the encoder 406 by the saw tooth region 302. Unlike conventional data pits, which are configured for operation only with laser (i.e. collimated or coherent) light, the surfaces may be configured for deflection or conventional light, as well as laser light. Moreover, the surfaces 402 function by deflecting light, rather than by absorbing it, unlike technology utilizing contrast between light and dark colors. And further, a variety of lower-cost light sources may be incorporated for use within the encoder 406, and used in conjunction with the saw tooth surface 302. CD and DVD data use pits that are one-quarter wavelength deep such that light reflecting off the bottom of the pit is 180 degrees (one-half wavelength) out of phase with that which reflects off the top surface surrounding the pit. The result is that the two sets of rays interfere destructively resulting in lessened light. Such pits could also be used to produce machine-readable patterns in outer ring 120 or 220. Another exemplary technique for producing readable patterns in the outer ring 120 or 220 is to use multiple tracks of pits produce a diffraction grating that redirects some of the light to certain angles away from the central spot and this also causes lessened light in the central spot.

FIGS. 5 and 6 are schematics showing enlarged structural detail of a second exemplary molded disc feature 502, a plurality of which would be suitable for formation of features 112, 116, 118. The molded feature 502 may be defined within polycarbonate plastic forming a layer within a CD or DVD. The molded feature 502 may be a "pit" having a non-planar surface or light-deflecting feature 504 for deflection of light. In the example of FIGS. 5 and 6, the light-deflecting feature 504 within the pit is a cone, but an alternate structure having a surface that is not perpendicular to incoming light could be substituted. The molded feature 502 (pit) may be scanned by an encoder 406, which sends light into the molded feature 502. Because the light-deflecting feature 504 does not reflect the light back to the encoder 406, the encoder signals a processor or controller accordingly.

FIG. 7 is schematic view of an exemplary optical disc drive 700, showing an encoder 406 configured to read molded disc speed features 112 (FIG. 1) to allow calculation of disc speed. The encoder 406 may additionally be configured to read the disc angular orientation features 114 (FIG. 1). Alternatively, the OPU 710 may be used to read molded or silk-screened disc angular orientation features 204 (FIG. 2). The OPU 710 may also be used to read features in outer ring 120 (FIG. 1) and 220 (FIG. 2) located within a range within which the OPU may be operated.

Still referring to FIG. 7, an exemplary disc 100 having an information side 702 is oriented to position the label side 704 for marking. The disc 100 is rotated by a disc or spindle motor 706, which is controlled by the spindle controller 708. In an exemplary application for an embodiment, an image may applied to the label area 106 (FIG. 1) of the disc 100 by an OPU 710 (optical pick-up unit). The OPU includes a laser for generating a laser beam, a focusing unit, and an optical sensor comprising a plurality of photosensitive elements. A beam splitter positioned in the light path between the laser and the disc surface sends light reflected from the disc surface to the optical sensor unit. The OPU 710 is moved radially over the label area 106 on a sled 712 moved by a sled motor 714 and sled controller 716 or switching device. The OPU 710 can also be moved to the outer ring area (e.g. 120 or 220, FIGS. 1 and 2), to read the features embedded therein. These features can include media identification data which may be used to identify characteristics and parameters for applying an image to the label area 106. The image can be applied to the label region 106 by the laser beam 718, which reacts a coating to form the image. A laser 720 producing the laser beam 718 is controlled by a controller 722 or similar switching device.

In the exemplary optical disc drive 700, the encoder 406 is typically able to read information on the disc that is radially inside or outside a region readable by the OPU (optical pick-up unit) 710. For example, the encoder 406 can read data features 110 (FIG. 1) which represent disc speed features and/or disc angular orientation features. Advantageously, the encoder 406 can read data from a first location on the optical disc 100 at the same time that the OPU 710 is reading or writing data on another part of the optical disc 100.

In an exemplary embodiment, the encoder 406 reads data by sending light 404 (FIG. 4) to distinguish areas of molded features from areas without molded features by distinguishing between the quantities of reflected light. The reading process results in signals conveying disc orientation information, as well as disc speed and angular orientation information. The signals may be interpreted by an encoder controller 724, or transferred directly to a controller 726.

The controller 726 may execute software or firmware 728 to control the overall operation of the OPU 710, sled motor 714, spindle motor 706 and encoder 406. Firmware 728 code may configure the encoder 406 to read the molded disc speed features 112 and/or molded disc angular orientation features 114. Firmware code may also enable the OPU 710 to read disc angular orientation features 204 that are molded, printed and/or silk-screened onto the disc, typically within the label region 106. Firmware code also may enable the OPU 710 to read features in the outer rings 120 or 220.

In an exemplary embodiment, an optical disc such as a CD or DVD media may have reference data encoded in outer disc ring features. The data may include media identification control information, sometimes referred to below as "Media ID," by way of example only. Further description of exemplary media identification control data is provided in commonly assigned, pending application Ser. No. 10/836,866, filed Apr. 30, 2004. Exemplary embodiments provide media identification control features on one or more sides of recording media, such as a disc, which contain information that assists a label writer in applying a label to the disc. The media identification control features are read by the label writer and used to determine proper and suitable settings or parameters for applying the label to the disc. The media identification control features can include information such as: safety parameters for safely applying the label to the disc; marking parameters which may include minimum and maximum laser power settings; marking speeds; other features needed for creating the label, quality parameters that include information for enhancing the visual quality of the label; and other fields for advantageously creating the label. By utilizing this information, labels may be suitably applied to different discs having different properties or materials. Although this description describes the recording media as being an exemplary disc, other forms of recording media embodiments, such as memory cards, magnetic cards, and imageable material (e.g. photographs), to name a few, can implement the disc. A label can include text, graphics, or combinations of text and graphical information.

To facilitate reading this media identification data by a machine, e.g. a sensor system having a plurality of photosensitive elements in an OPU such as OPU 710 (FIG. 7), an index mark feature is included. The machine detects the index mark as a reference for reading the Media ID. The data patterns may be applied to the media in various ways, e.g. by embossing or silkscreening. For example, in the exemplary case of an optical sensor system, the data and index mark features may be represented by areas of high reflectivity and low reflectivity. This may be achieved, for example, by creating areas of low reflectivity in a reflective layer on or embedded within the media. For example, a layer of aluminum may be employed as a reflective layer, and the layer selectively removed or pits formed in the media to create the non-reflective areas.

FIG. 8 depicts an exemplary Index Mark pattern 20 comprising reflective regions 22A-22G and non-reflective regions 24A-24G. In an exemplary embodiment, the pattern 20 is formed in an outer ring 120 or 220 (FIGS. 1-2), followed by media identification data fields also in the outer ring. In this embodiment, the reflective regions 22A-22C and 22E-22G have a length equal to 2.5 sample periods, and reflective region 22D has a length equal to 5 sample periods. The non-reflective regions have a length equal to 2.5 sample periods. A data bit with a "1" value is also shown as reflective region 10; the region 10 has a length of four sample periods, i.e. an integer multiple of the sample period defined by the encoder spoke spacing. The pattern 20 is selected to provide a pattern which will not be, or at least is very unlikely to be, duplicated by data patterns in the media identification data field following the Index Mark pattern. The pattern 20 in this exemplary embodiment is selected so that the sample points which occur on leading edge transitions of regions 22A, 22B, 22C on the left side of region 22D will not occur on leading edge transitions of regions 22E, 22F, 22G on the right side of region 22D. In this embodiment, the index mark pattern includes a first mark type (e.g. 22A) having a length less than a bit length (of region 10) in the data pattern, and a second mark type (22C) having a length greater that the bit length. Other embodiments of an index mark pattern may consist of marks all having a length less than data bit 10, or of marks all having a length greater than data bit 10. Another embodiment of an index mark pattern may have a greater number of marks leading or trailing a center mark 22D, e.g. two additional marks similar to mark 22A in advance of mark 22A, to allow the controller to determine a direction of rotation relative to the index mark pattern.

Figure 9:
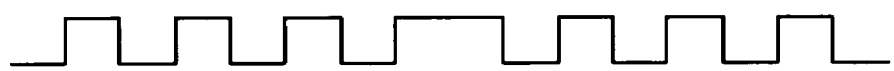
FIG. 9 depicts an ideal sensor output signal pattern, showing a response to the exemplary mark pattern of FIG. 8.
Figure 9A:
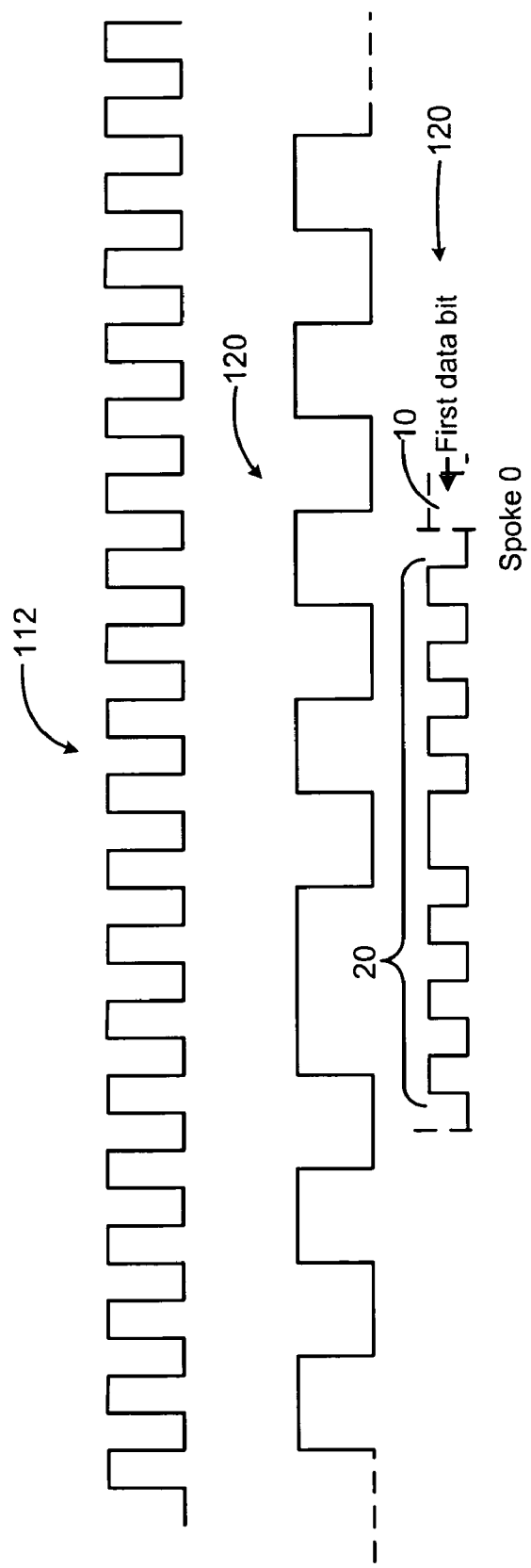
FIG. 9A depicts in a linearized illustration an exemplary spatial relationship between an exemplary set of radial encoder spoke features and an exemplary index mark feature set.
Figure 9B:
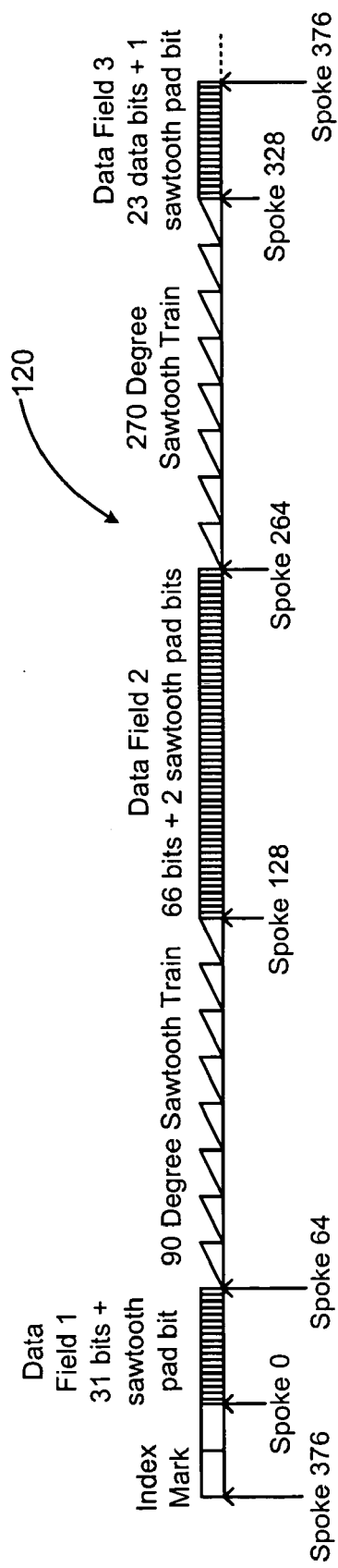
FIG. 9B depicts in a linearized illustration an exemplary outer ring of features.

FIG. 9 depicts an exemplary embodiment of an ideal sensor output signal pattern, showing a response to the exemplary mark pattern 20 of FIG. 8. Here the reflective regions have a digital "1" value, and the non-reflective regions have a "0" value. FIG. 9A depicts in a linearized illustration an exemplary spatial relationship between the radial encoder spoke features 112 and a portion of an exemplary index mark feature set 20, as well as, in a reduced scale, an entire exemplary index mark feature set 20. FIG. 9B depicts in a linearized illustration an exemplary outer ring 120 of features including an index mark feature, a first data field, a first train of sawtooth features, a second data field and a second train of sawtooth features, covering the full 360 degrees of an exemplary outer ring. The relation to exemplary spokes of an inner encoder spoke feature ring is also indicated.

In an exemplary embodiment, in order to detect the index mark, the optical pickup unit (OPU) 710 is positioned so that the OPU laser beam is positioned somewhere in the outer ring. With the laser beam positioned in the outer ring, focus is acquired, e.g., using a feedforward algorithm if the media is a CD disc, and using the drive's standard closed loop focus servo if it is a DVD disc. An exemplary feedforward algorithm is described in commonly assigned, pending application Ser. No. 10/661,394, "Optical Disk Drive Focusing Apparatus," filed Sep. 12, 2003.

Once focus is acquired, the media ID signals or data can be sensed in the SUM signal, which represents the sum of the outputs from the plurality of photosensitive elements in the OPU. In an exemplary embodiment, this signal is filtered, AC coupled and passed through a threshold comparator before being sent to the controller, e.g. to a pin in a microprocessor comprising the drive controller. FIG. 9 depicts an exemplary signal sent to the controller.

Figure 10:
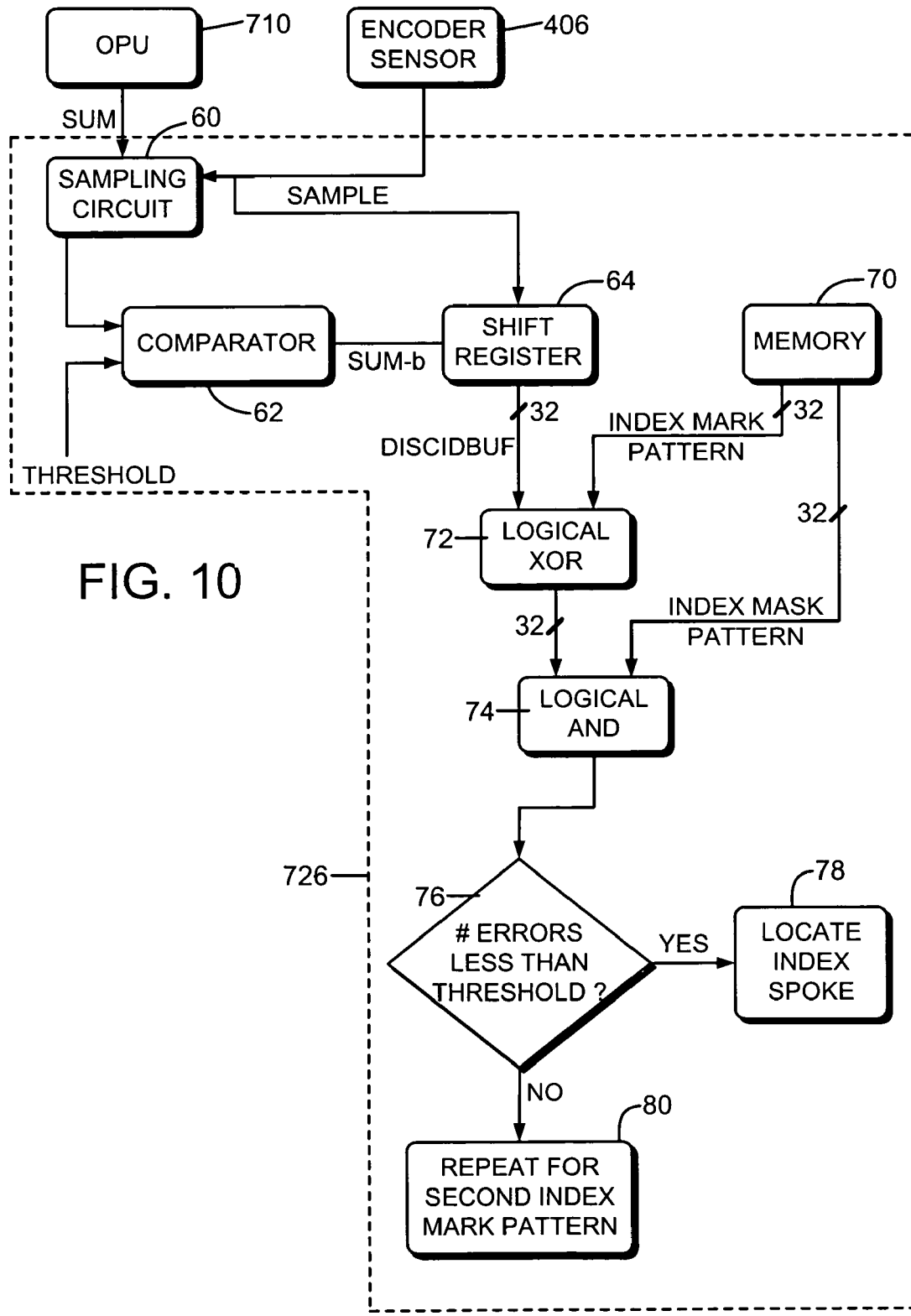
FIG. 10 is a diagrammatic schematic depiction of a system for detecting an Index Mark pattern.

FIG. 10 is a diagrammatic schematic depiction of a system for detecting an Index Mark pattern, which in an exemplary embodiment is encoded in an outer ring pattern also including the media ID data, on a CD or DVD media. The CD or DVD media in an exemplary embodiment also includes an inner ring pattern of encoder markings or elements, e.g. reflective radial spokes (112, FIG. 1) evenly spaced about the inner ring. An encoder sensor 406 (FIGS. 4, 7, 10) reads the encoder pattern, generating an encoder signal pattern which can be used by a media drive controller, e.g. to control a drive motor for rotating a spindle and providing a desired media rotational speed. For reading of the media ID, each detection of an edge (rising and falling) of the inner ring spoke pattern generates an interrupt signal (SAMPLE) to the controller microprocessor for spindle speed control. In an exemplary embodiment, there are 400 inner ring spokes, resulting in 800 interrupts per revolution.

In an exemplary embodiment, once the spindle speed control routine is complete in each interrupt cycle, the SUM signal is sampled by a sampling circuit 60, and compared (62) to a threshold value to produce a binary value (one or zero) signal, SUM-b. This binary-valued signal is added to the LSB of a 32 bit word, called the "DiscIDBuff." This word has been left-shifted since the last interrupt cycle to make a place for the new bit value. This 32 bit word acts as a shift register 64 and each bit is shifted from the LSB toward the MSB one position as the system advances from interrupt to interrupt.

The 32 bit word DiscIDBuff is compared at each interrupt time to a fixed pattern, an Index Mark pattern, that represents what the register contents should look like at the time when the Index mark pattern has gone by. Because interrupts, and hence sampling, could occur simultaneously with edges of the Index mark signal, an "Index Mask" pattern is defined to have zeros in each position where there would be uncertainty (meaning a transition of the threshold SUM occurs simultaneously with the interrupt sampling point) and ones everywhere else. This mask pattern may be stored in a memory 70. The Index Mark pattern may also be stored in memory 70. The Index Mark and Index Mask patterns are described more fully below.

In an exemplary embodiment, in order to test for the presence of the Index Mark, the DiscIDBuff word is logically exclusive-ORed (XOR'd) (72) with an Index Mark Pattern, and the result is logically AND'd (74) with the corresponding Index Mask pattern. The AND operation discards the bits which are at transitions. Once these two operations are completed, there should be 1's in every position where the DiscIDBuff word did not match the index mark pattern and zero's where it did, including those positions where uncertainty would exist. If the number of errors (indicated by the 1's in the result of operation (74) is less than some predetermined threshold (76), e.g. 3 errors in an exemplary embodiment, then the Index Mark pattern has been located, allowing the index spoke mark to be marked (78), as described more fully below. If the number of errors is not less than the threshold, then the process (72, 74, 76) is repeated (80) for a second Index Mark pattern. If the result for the second Index Mark pattern has a number of errors which is not less than the threshold, then the process repeats for the next interrupt cycle, and so on. FIG. 10 thus illustrates a method for acquiring an index mark pattern in a data pattern on an optical disc, comprising sampling at a sample rate an output of an optical sensor sensing the data pattern; loading successive digitized samples of the output into a least significant bit of a shift register, the register holding a digital word of length equal to a predetermined length of the index mark pattern; comparing the digital word to a fixed index pattern selected in accordance with the index mark pattern to provide a comparison word (the output of 72) having bit values showing disagreement or agreement in the comparison; discarding disagreement bits in the comparison word at bit locations sampled at predetermined transition locations to provide a compensated comparison word (the output of 74); analyzing the compensated comparison word to determine a number of errors in the comparison; and declaring that the index mark pattern has been sensed if the number of errors does not exceed a predetermined error threshold. The discarding of disagreement bits comprises logically ANDing the comparison word with an index mask pattern having zeros in the bit locations at predetermined transition locations.

Operations depicted in FIG. 10 may be carried out by the system controller 726 in an exemplary embodiment, which may include a microprocessor programmed to carry out the logical operations depicted in FIG. 10. In other embodiments, the controller may include discrete logic and circuits for performing some or all of the functions depicted in phantom line 726 in FIG. 10.

Depending how the samples are aligned with the index mark, it is possible to see one of two different patterns, each of which has uncertainty in differing bit positions. Therefore both of these patterns may be tested. In an exemplary embodiment, the pattern most likely to occur is tested first and, if not found, the second pattern is tested. When either the first or second pattern is detected, the spoke counter may be reset such that spoke zero occurs on the first transition after the index mark pattern.

Figure 11:
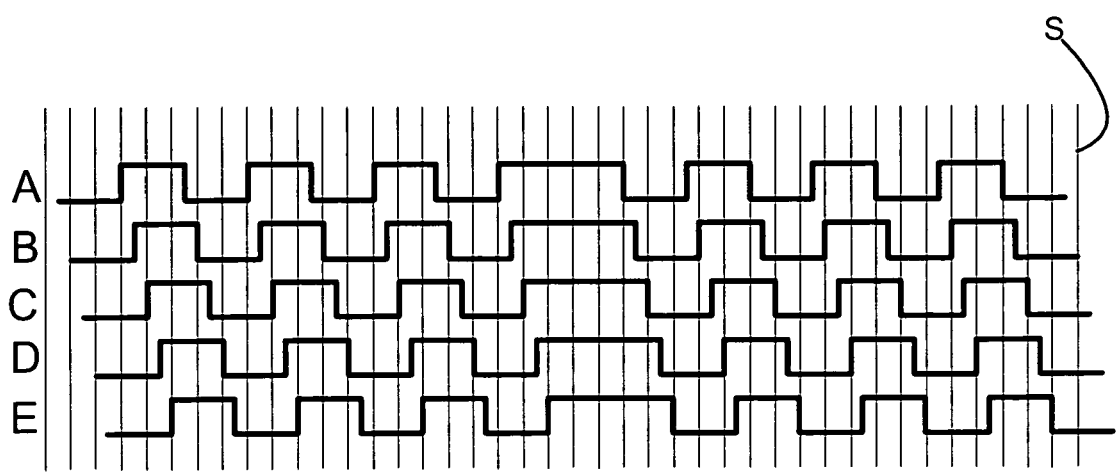
FIG. 11 is an exemplary representation of an exemplary processed OPU output signal, showing several different alignment possibilities with the sampling interrupts.

FIG. 11 is an exemplary representation of the processed OPU output signal, SUM-b, of the sensed index mark, showing several different alignment possibilities A-E with the sampling interrupts (vertical lines). The respective alignment possibilities are successively shifted by ½ the sampling interval in this example. The low portions of the waveforms indicate low reflectivity and the high portions indicate high reflectivity. If each waveform above is sampled at the interrupt events indicated, the following bit patterns are obtained, where '0' indicates a low, '1' indicates high and "x" indicates uncertainty due to proximity to a transition:

A: x00x1100x1100x1100x1111x0011x0011x0011x00x
B: xx0011x0011x0011x001111100x1100x1100x1100x
C: xx00x1100x1100x1100x1111x0011x0011x0011x00
D: xxx0011x0011x0011x001111100x1100x1100x1100
E: xxx00x1100x1100x1100x1111x0011x0011x0011x0

The index spoke is defined to be the inner ring spoke sensed by the encoder sensor at a time closest to the end of the index mark pattern, which, in FIG. 11, is where the line stops on the right. Following this point is the first data bit in an exemplary embodiment. In FIG. 11, it can be seen that the rightmost sample time S occurs simultaneously with the end of the index pattern for waveform B. This will be the pattern looked for first, i.e. the pattern labeled 'B' in the list above. If all "x" locations are replaced with "1" arbitrarily, the fixed Index Mark pattern for B becomes, with separating bars for facilitating conversion to hex:

Mark:
  1100|1100|1|1100|1110|0111|1100|1110|0111|0011|1001

Then, forming an index mask by putting 0's where the 'x's are and '1's everywhere else, we have:
B: xx0011x0011x0011x00111 1100 x1100x1100x1100x
Mask:
  0011|1101|1|1011|1101|1111|1111|0111|1011|1101|1110

The second pattern to be looked for is based on the A waveform. If all "x" locations are replaced with "1" arbitrarily, the Index Mark pattern A becomes:
  10011100111001110011111100111001110011100111001

Then, forming an index mask by putting 0's where the 'x's are and '1's everywhere else in the A pattern, we have:
A: x00x1100x1100x1100x1111x0011x0011x0011x00x
Mask: 0110111101111011111011110111101111011110110

The bit pattern in DiscIDBuff at each spoke time, i.e. at each SAMPLE (FIG. 3) interrupt, is compared to the first pattern (pattern B in this example) and its corresponding mask, and then the second pattern (pattern A in this example) and its corresponding mask, and the number of errors totaled. In an exemplary embodiment, if 3 or fewer errors are detected, spoke 0 is declared. This spoke 0 aligns with the first data bit of the beginning of the Media ID field (FIG. 9B). In an exemplary embodiment, it is desired to provide some margin for errors, e.g. resulting from scratches or other defects on the media being read. Allowing a spoke 0 to be declared with an error or up to some predetermined number of errors provides such a margin.

Once the end of the index mark (spoke 0) has been detected, other information in the outer media ID ring can be read. The spoke 0 allows the controller to keep track of the angular position of the disc in relation to the media data field, and provides a reference between the inner spoke ring and the outer pattern ring containing the media identification data. A fine actuator calibration, described in commonly assigned, pending application Ser. No. 10/661,394, filed Sep. 12, 2003, "Calibrating Fine Actuator Using a Reference Pattern," may optionally be performed, by positioning the OPU laser over the outer media features ring at 9 different radii and incurring a rotation of the disc at each radius over sawtooth patterns in the outer ring. The media ID data in the outer ring may be sampled during these nine rotations at each of the nine different radii. In other embodiments, the media ID data can be read during a single rotation of the disc, or read twice during two rotations of the disc. In an exemplary embodiment, the media ID is sampled on every 4th spindle control interrupt (assuming 800 per cycle) after spoke 0 has been found. The first sample occurs at spoke 2, the next at spoke 6, the next at 10 and so forth. With this exemplary phasing, these sample points are very close to the center of each media ID bit. The polarity of SUM at each of these sample points is saved into a buffer and this becomes the decoded contents or data contained in the media ID. This data may then be used to for proper control of a subsequent label printing procedure.

Following are exemplary steps in a technique for printing a label, employing an identification of an Index Mark pattern as described above.

1. The drive spins the disc at the correct speed by using spindle motor control.
2. Proper focus is established for the inserted media.
3. The drive moves the optical pickup unit close to the media identification features.
4. The drive steps into the media identification features
5. The drive looks for the index mark pattern.
6. The drive synchronizes internal counters in the controller to the index mark (zero degree rotation position).
7. The drive determines the media identification features read position.
8. The drive calibrates the gain of the fine actuator, e.g. using the sawtooth (triangular) marks.
9. The drive reads data.
10. The drive moves the laser over to the label imaging area (the home diameter position—track 0) at the edge of the sawtooth pattern.
11. The labeling application reads the drive and media capabilities stored in the drive.

12. The labeling application determines the optimal drive parameters for labeling and sends them to the drive.

13. The labeling application optimizes the image and generates the image file.

14. The host transfers image information to the drive in a set of Print records.

15. The drive positions the laser over the specified starting track and angle.

16. The drive prints the first track.

17. The drive moves to the next track and start angle, as specified in the next Print record.

18. The drive continues to write tracks. The Print record marked "last" contains the last of the information that the drive writes and terminates printing.

Although the foregoing has been a description and illustration of specific embodiments of the invention, various modifications and changes thereto can be made by persons skilled in the art without departing from the scope and spirit of the invention as defined by the following claims. For example, while the exemplary embodiments described above are directed to optical disc applications, the techniques for finding the media index mark pattern may be used in other applications.

What is claimed is:

1. A method for acquiring an index mark pattern in a data pattern, comprising:

sequentially acquiring successive digitized samples of a portion of the data pattern equal in length to a length of the index mark pattern;

logically Exclusively Oring each digitized sample with a fixed mark pattern which represents an expected index mark pattern corresponding to the index mark pattern with bit positions at edge transitions of the index mark pattern set to a "1";

logically ANDing a result of said logical Exclusive Oring step with a fixed mask pattern which has bit positions set to 0 at positions corresponding to edge transitions of the index mark pattern to provide a result having "1"s in every position in which the digitized sample does not agree with the fixed mark pattern.

2. The method of claim 1, wherein the index mark pattern includes a first mark type having a length less than a bit length in the data pattern, and a second mark type having a length greater that the bit length.

3. The method of claim 2 wherein sequentially acquiring successive digitized samples comprises sampling a sensor output at a sample rate defining a sample period, and wherein the data bit length is equal to four sample periods in duration, said first mark type has a length equal to 2½ sample periods in duration, and the second mark type has a length equal to 5 sample periods in duration.

4. The method of claim 1, wherein the index mark pattern consists of mark types having a length less than a bit length in the data pattern.

5. The method of claim 1, wherein the index mark pattern consists of mark types having a length greater than a bit length in the data pattern.

6. A disc drive system, comprising:

means for rotating an optical disc;

means for scanning an encoder reference pattern on the optical disc while it is rotating;

means for sensing a media data pattern on the optical disc and sampling a sensor output at a sample rate determined by the encoder reference pattern to provide a sampled thresholded signal;

means for processing the sampled thresholded signal to determine whether an index pattern has been sensed; and means for identifying a reference mark in the encoder reference pattern corresponding to a location of said index pattern.

7. The system of claim 6, further comprising means for reading media identification data in the media data pattern following identification of the index pattern.

8. The system of claim 6, wherein the index pattern includes a first mark type having a length less than a bit length in the media data pattern, and a second mark type having a length greater that the bit length.

9. The system of claim 8 wherein said sample rate defines a sample period, and wherein the data bit length is equal to four sample periods in duration, said first mark type has a length equal to 2½ sample periods in duration, and the second mark type has a length equal to 5 sample periods in duration.

10. The system of claim 6, wherein the index pattern consists of mark types having a length less than a bit length in the media data pattern.

11. The system of claim 6, wherein the index mark pattern consists of mark types having a length greater than a bit length in the media data pattern.

12. A method for acquiring an index mark pattern in a data pattern on an optical disc, comprising:

sampling at a sample rate an output of an optical sensor sensing the data pattern;

loading successive digitized samples of said output into a least significant bit of a shift register, the register holding a digital word of length equal to a predetermined length of the index mark pattern;

comparing the digital word to a fixed index pattern selected in accordance with the index mark pattern to provide a comparison word having bit values showing disagreement or agreement in said comparison;

discarding disagreement bits in the comparison word at bit locations sampled at predetermined transition locations to provide a compensated comparison word;

analyzing the compensated comparison word to determine a number of errors in said comparison;

declaring that the index mark pattern has been sensed if the number of errors does not exceed a predetermined error threshold.

13. The method of claim 12, wherein the index mark pattern includes a first mark type having a length less than a bit length in the data pattern, and a second mark type having a length greater that the bit length.

14. The method of claim 12, wherein said sample rate defines a sample period, and wherein a data bit length is equal to four sample periods in duration, said first mark type has a length equal to 2½ sample periods in duration, and the second mark type has a length equal to 5 sample periods in duration.

15. The method of claim 12, wherein the index mark pattern consists of mark types having a length less than a bit length in the data pattern.

16. The method of claim 12, wherein the index mark pattern consists of mark types having a length greater than a bit length in the data pattern.

17. The method of claim 12, wherein said comparing the digital word comprises logically exclusively Oring said digital word and said fixed index pattern.

18. The method of claim 12, wherein said discarding disagreement bits comprises logically ANDing said comparison word with an index mask pattern having zeros in said bit locations at predetermined transition locations.

19. The method of claim 12, further comprising, in the event said number of errors exceeds said error threshold, comparing the digital word to a second fixed index pattern selected in accordance with the index mark pattern to provide a second comparison word having bit values showing disagreement or agreement in said comparison, said second fixed index pattern different from said fixed index pattern;

discarding disagreement bits in the second comparison word at bit locations sampled at predetermined transition locations to provide a second compensated comparison word;

analyzing the second compensated comparison word to determine a number of errors in said comparison;

declaring that the index mark pattern has been sensed if the number of errors does not exceed a predetermined error threshold.

20. A disc drive system comprising:
a drive system for rotating an optical disc;
an optical pickup unit (OPU) comprising a laser and an OPU optical sensor;
a positioning drive system for moving the OPU radially in relation to the optical disc;
a control unit for controlling the drive system, OPU and positioning drive system;
an optical encoder sensor for scanning an encoder reference pattern on the optical disc while it is rotating;
the control unit responsive to the optical encoder sensor and OPU, and adapted to position the OPU to sense a media data pattern on the optical disc at a sample rate determined by the encoder reference pattern to provide a sampled thresholded binary-valued signal, to process the sampled thresholded signal to determine whether an index pattern has been sensed, and to identify a reference mark in the encoder reference pattern corresponding to a location of said index pattern.

21. The system of claim 20, wherein the control unit is further adapted to read media identification data in the media data pattern following identification of the index pattern.

22. The system of claim 20, the optical encoder sensor is located radially inwardly of the OPU.

23. An optical disc medium, comprising:
a set of data arranged in a data field, the set of data defined by features having a data bit length; and
an index mark pattern for identifying a relative location of the data field, the index mark pattern comprising a set of index features each having a length which is a non-integer multiple of said data bit length.

24. The medium of claim 23, further comprising a set of encoder features set at a regular interval spacing radially about a disc center in a first ring of features.

25. The medium of claim 24, wherein the set of data and said index mark pattern are arranged in a second ring of features.

26. The medium of claim 25 wherein said first ring of features and said second ring of features are disposed radially inside a disc label region.

27. The medium of claim 23, wherein said index mark pattern comprises a first mark type having a length less than said data bit length, and a second mark type having a length greater than said data bit length.

28. The medium of claim 23, wherein said data bit length is an integer multiple of said regular interval spacing.

29. The medium of claim 28, wherein each said length of said index features is an non-integer multiple of said regular interval spacing.

30. A method for reading an index pattern, comprising:
rotating an optical disc;
scanning an encoder reference pattern on the optical disc while it is rotating;
sensing a media data pattern on the optical disc and sampling a sensor output at a sample rate determined by the encoder reference pattern to provide a sampled thresholded signal;
processing the sampled thresholded signal to determine whether an index pattern has been sensed; and
identifying a reference mark in the encoder reference pattern corresponding to a location of said index pattern.

31. The method of claim 30, further comprising:
reading media identification data in the media data pattern following identification of the index pattern.

32. The method of claim 30, wherein the index mark pattern includes a first mark type having a length less than a bit length in the media data pattern, and a second mark type having a length greater that said bit length in the media data pattern.

33. The method of claim 32 wherein said sample rate defines a sample period, and wherein the data bit length is equal to four sample periods in duration, said first mark type has a length equal to 2½ sample periods in duration, and the second mark type has a length equal to 5 sample periods in duration.

34. The method of claim 30, wherein the index mark pattern consists of mark types having a length less than a bit length in the media data pattern.

35. The method of claim 30, wherein the index mark pattern consists of mark types having a length greater than a bit length in the media data pattern.

36. A recording medium, comprising:
a set of data arranged in a data field, the set of data defined by features having a data bit length;
an index mark pattern for identifying a relative location of the data field, the index mark pattern comprising a set of index features each having a length which is a non-integer multiple of said data bit length.

37. The medium of claim 36, further comprising a set of encoder features set at a regular interval spacing radially about a medium center in a first ring of features.

38. The medium of claim 37, wherein the set of data and said index mark pattern are arranged in a second ring of features.

39. The medium of claim 38, wherein said index mark pattern comprises a first mark type having a length less than said data bit length, and a second mark type having a length greater than said data bit length.

40. The medium of claim 38, wherein said bit length is an integer multiple of said regular interval spacing.

41. The medium of claim 40, wherein each said length of said index features is an non-integer multiple of said regular interval spacing.

42. The medium of claim 38 wherein said first ring of features and said second ring of features are disposed radially inside a medium label region.

* * * * *

UNITED STATES PATENT AND TRADEMARK OFFICE
CERTIFICATE OF CORRECTION

PATENT NO. : 7,349,297 B2 Page 1 of 1
APPLICATION NO. : 11/012691
DATED : March 25, 2008
INVENTOR(S) : Darwin M. Hanks It is certified that error appears in the above-identified patent and that said Letters Patent is hereby corrected as shown below:

In column 11, line 31, in Claim 1, delete "Oring" and insert -- ORing --, therefor.

In column 11, line 36, in Claim 1, delete "Oring" and insert -- ORing --, therefor.

In column 12, line 64, in Claim 17, delete "Oring" and insert -- ORing --, therefor.

Signed and Sealed this

Twelfth Day of August, 2008

JON W. DUDAS
*Director of the United States Patent and Trademark Office*